(12) United States Patent
Nakata et al.

(10) Patent No.: US 10,579,302 B2
(45) Date of Patent: Mar. 3, 2020

(54) SEMICONDUCTOR DEVICE

(71) Applicant: Toshiba Memory Corporation, Tokyo (JP)

(72) Inventors: Hiroki Nakata, Yokohama Kanagawa (JP); Manabu Matsumoto, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 912 days.

(21) Appl. No.: 15/051,256

(22) Filed: Feb. 23, 2016

(65) Prior Publication Data

US 2017/0109098 A1 Apr. 20, 2017

(30) Foreign Application Priority Data

Oct. 20, 2015 (JP) ................. 2015-206533

(51) Int. Cl.
*G06F 3/00* (2006.01)
*G06F 3/06* (2006.01)
(Continued)

(52) U.S. Cl.
CPC ............ *G06F 3/0659* (2013.01); *G06F 3/061* (2013.01); *G06F 3/0604* (2013.01); *G06F 3/0614* (2013.01); *G06F 3/0634* (2013.01); *G06F 3/0635* (2013.01); *G06F 3/0664* (2013.01); *G06F 3/0688* (2013.01); *G06F 12/0246* (2013.01); *G06F 12/0253* (2013.01); *G06F 13/1668* (2013.01); *G06F 13/4068* (2013.01); *G06F 13/4282* (2013.01); *G06F 2212/1044* (2013.01); *G06F 2212/205* (2013.01); *G06F 2212/7205* (2013.01)

(58) Field of Classification Search
None
See application file for complete search history.

(56) References Cited

U.S. PATENT DOCUMENTS 7,777,347 B2 * 8/2010 Kuroda ............... H01L 23/3128
257/686
8,364,924 B2 * 1/2013 Belluomini ......... G06F 12/0868
711/103
(Continued)

FOREIGN PATENT DOCUMENTS

JP H0218155 U 2/1990
JP 2007304779 A 11/2007
(Continued)

*Primary Examiner* — Midys Rojas
(74) *Attorney, Agent, or Firm* — Kim & Stewart LLP

(57) ABSTRACT

A semiconductor device includes a first substrate on which an interface unit connectable to a host device is provided, a first memory module on the first substrate, and a first controller on the first substrate. The first controller includes a control unit that controls the first memory module, and a switching unit that switches an operation mode in response to a command from the host device. A first connecting portion is provided on the first substrate and is electrically connected to the first memory module and the first controller. The first controller can directly access a second memory module through the first connecting portion. Thus, for example the first controller can read data stored in the second memory module depending on operation mode.

20 Claims, 8 Drawing Sheets

(51) Int. Cl.
*G06F 12/02* (2006.01)
*G06F 13/16* (2006.01)
*G06F 13/40* (2006.01)
*G06F 13/42* (2006.01)

(56) References Cited

U.S. PATENT DOCUMENTS

| | | |
|---|---|---|
| 8,433,882 B2 | 4/2013 | Kurashige et al. |
| 9,201,604 B2 * | 12/2015 | Cho ................... G06F 3/0605 |
| 9,930,618 B2 * | 3/2018 | Kim .................. H04W 52/0209 |
| 2010/0073860 A1 | 3/2010 | Moriai et al. |
| 2012/0093318 A1 | 4/2012 | Obukhov et al. |
| 2012/0311275 A1 | 12/2012 | Muramatsu et al. |
| 2013/0250644 A1 | 9/2013 | Watanabe |

FOREIGN PATENT DOCUMENTS

| | | |
|---|---|---|
| JP | 2009086830 A | 4/2009 |
| JP | 2010079445 A | 4/2010 |
| JP | 2012068766 A | 4/2012 |
| JP | 2013225277 A | 10/2013 |

\* cited by examiner

SEMICONDUCTOR DEVICE

CROSS-REFERENCE TO RELATED APPLICATION

This application is based upon and claims the benefit of priority from Japanese Patent Application No. 2015-206533, filed Oct. 20, 2015, the entire contents of which are incorporated herein by reference.

FIELD

Embodiments described herein relate generally to a semiconductor device.

BACKGROUND

A semiconductor device provided with a non-volatile memory and a controller is provided.

DETAILED DESCRIPTION

Figure 1:
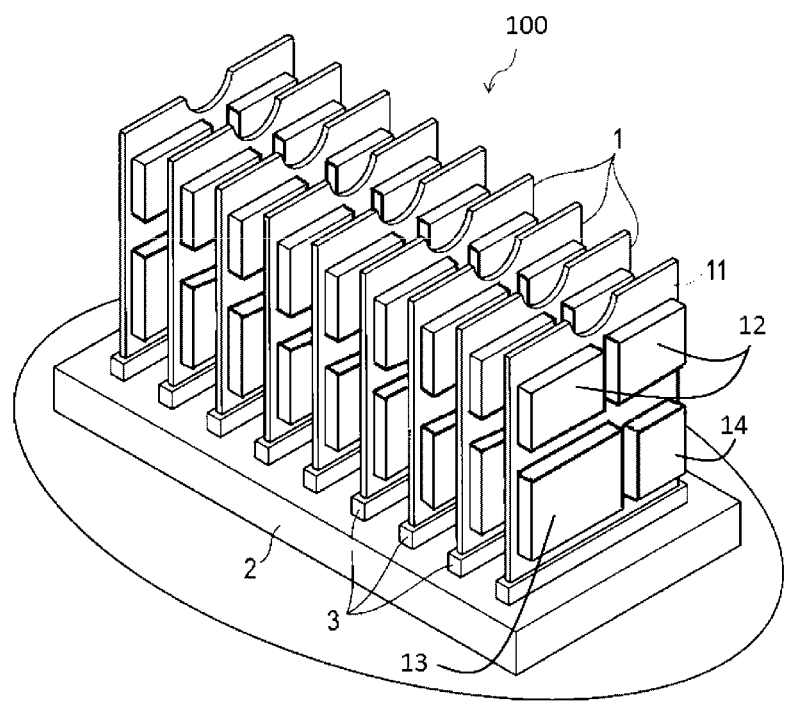
FIG. 1 is a perspective view of a semiconductor device according to a first embodiment.

Example embodiments provide an efficient saving of data in a semiconductor device.

In general, according to one embodiment, a semiconductor device includes: a first substrate on which an interface unit connectable to a host device is provided, a first memory module on the first substrate, and a first controller on the first substrate. The first controller includes a control unit that controls the first memory (e.g., performs read/write/erase operations), and a switching unit that switches an operation mode of the first controller in response to a command from the host device such that in a first operation mode the first controller reads data from the first memory module and in a second operation mode the first controller reads data from the second memory module. A first connecting portion is provided on the first substrate and is electrically connected to the first memory and the first controller and is electrically connectable to the second memory module. The first controller can thus directly access the second memory module through the first connecting portion to reads data stored in the second memory module. The second memory module may be external—that is, not disposed on the first substrate.

Hereinafter, embodiments will be described with reference to the drawings.

In the present disclosure, some elements are denoted by a plurality of exemplary terms. These exemplary terms are merely examples and not necessarily limitations and the various elements may be referred to using different terms while maintaining substantially the same meaning or expressing substantially the same concept. The elements that are denoted by a plurality of terms may also be referred to in other contexts by other terms not explicitly mentioned in the present disclosure.

Furthermore, the drawings are schematic and presented for purposes of explaining various aspects of the present disclosure. As such, the depicted relationships between dimensions, such as element thickness or planar area, and/or depicted ratio between thicknesses of respective layers or other element dimensions may differ from the relationship(s) and ratio(s) in an actual device. The dimensional relationships and ratios may differ among the various drawings. Furthermore, some components and configuration details may be omitted in the drawings for purposes of clarity or explanation of specific aspects of the present disclosure.

First Embodiment

Figure 2:
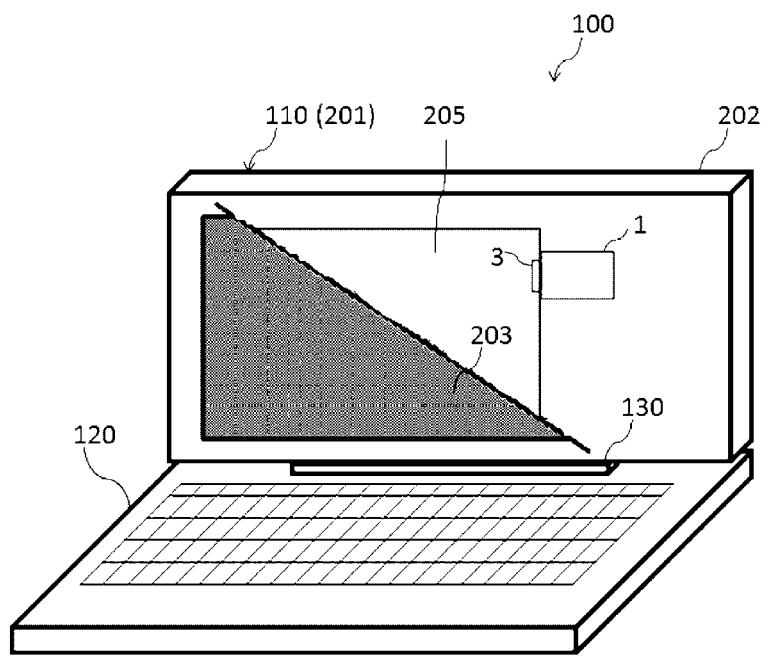
FIG. 2 is a partially cutaway perspective view of the semiconductor device mounted on a host device.
Figure 3:
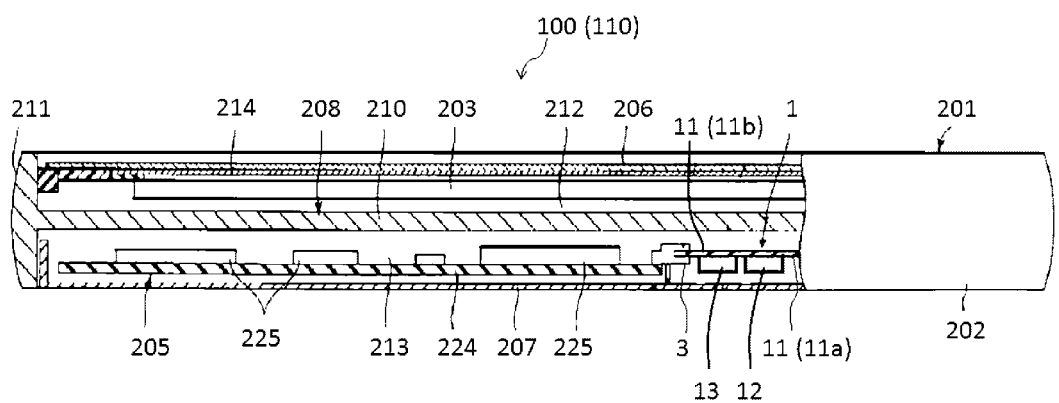
FIG. 3 is a partially cutaway cross-sectional view of a tablet portion of the host device.

FIGS. 1 to 3 illustrate a semiconductor device 1 according to a first embodiment and a system 100 incorporating the semiconductor device 1. The system 100 is an example of an "electronic device" or "electronic equipment." The semiconductor device 1 is an example of "a semiconductor module" or "a semiconductor memory device." The semiconductor device 1 according to the first embodiment is, for example, a memory system such as a solid state drive (SSD), but is not limited thereto.

As illustrated in FIG. 1, the semiconductor device 1 is used as a storage device in the system 100 such as a server. The semiconductor device 1 may be referred to in this exemplary context as "built-in," "integrated," or "integral" storage or memory. The system 100 includes the semiconductor device 1, and a host device 2. Here, the semiconductor device 1 is mounted in the host device 2. The host device 2 includes, for example, a plurality of connectors 3 (for example, slots) which are opened upward. A different semiconductor device 1 can be mounted in each connector 3.

Here, a plurality of semiconductor devices 1 are respectively mounted in the connectors 3 of the host device 2, and the semiconductor devices 1 are arranged and supported to be in a standing state in a substantially vertical direction. According to such a configuration, the plurality of semiconductor devices 1 can be compactly arranged and mounted, thereby allowing a reduction in the size of the host device 2.

For example, a semiconductor device 1 may be used as a storage device in electronic equipment such as a notebook portable computer, a tablet-type computer, a tablet terminal, or detachable notebook personal computers (PCs).

Hereinafter, a case where the semiconductor device 1 is mounted on a detachable notebook PC (which corresponds to the host device 2) will be described with reference to FIGS. 2 and 3. Here, since the detachable notebook PC is an example of the host device 2, the detachable notebook PC is denoted by the same reference numeral as the host device (2), and is described as a detachable notebook PC 2. Further, when the detachable notebook PC 2 is connected to a semiconductor device 1 they may be referred to collectively as a system 100. Hereinafter, a description will be made regarding an example in which a semiconductor device 1 is mounted in the detachable notebook PC 2.

FIG. 2 is a diagram depicting a semiconductor device 1 mounted on a detachable notebook PC 2. FIG. 3 is a cross-sectional view of a display unit 110 (a tablet-type portable computer 201) of the detachable notebook PC 2 illustrated in FIG. 2. The display unit 110 is connected to a keyboard unit 120 (which is a first input receiving device) through a connecting portion 130 in a detachable manner. That is, the keyboard unit 120 is separable/detachable from the display unit 110. In some embodiments, the display unit 110 may also incorporate the functions of a tablet-type portable computer capable of independent operation when detached from keyboard unit 120. In this context, the display unit 110 may be referred to as tablet-type portable computer 201. Furthermore, the tablet-type portable computer 201 is also an example of a host device 2.

As illustrated in FIGS. 2 and 3, semiconductor device 1 is mounted on the display unit (110) side of the detachable notebook PC 2. Therefore, when detached, the display unit 110 can function as the tablet-type portable computer 201. While detached (or attached) the display unit 110 can function as a second input receiving device (e.g., a touch screen device).

The portable computer 201 is an example of electronic equipment, and has, for example, a size such that the user can hold in their hand and use.

The portable computer 201 includes a housing 202, a display module 203 (portion of which is cut away in FIG. 2 to show internal components of portable computer 201), a semiconductor device 1, and a motherboard 205 as major components. The housing 202 includes a protective plate 206, a base 207, and a frame 208. The protective plate 206 is a plate made of glass or plastic, and forms the surface of the housing 202. The base 207 is made of, for example, metal such as an aluminum alloy or a magnesium alloy, and forms the bottom of the housing 202.

The frame 208 is provided between the protective plate 206 and the base 207. The frame 208 is made of, for example, metal such as an aluminum alloy or a magnesium alloy, and has as integral portions a mounting portion 210 and a bumper portion 211. The mounting portion 210 is provided between the protective plate 206 and the base 207. According to the first embodiment, a first mounting space 212 is a space between the mounting portion 210 and the protective plate 206, and a second mounting space 213 is a space between the mounting portion 210 and the base 207.

The bumper portion 211 is formed integrally with the outer peripheral edge of the mounting portion 210, and surrounds the first mounting space 212 and the second mounting space 213 in the circumferential direction. Further, the bumper portion 211 forms the outer peripheral surface of the housing 202 while also being extended in the thickness direction of the housing 202 between the outer peripheral edge of the protective plate 206 and the outer peripheral edge of the base 207.

The display module 203 is accommodated in the first mounting space 212 of the housing 202. The display module 203 is covered with the protective plate 206, and a touch panel 214 having a handwriting input function or the like is interposed between the protective plate 206 and the display module 203. The touch panel 214 is affixed to the rear surface of the protective plate 206.

As illustrated in FIG. 3, the semiconductor device 1 and the motherboard 205 are accommodated in the second mounting space 213 of the housing 202. The semiconductor device 1 includes a substrate 11, a NAND memory 12, a controller 13, and other electronic components such as a DRAM 14.

The substrate 11 is, for example, a printed circuit board, and includes a first surface 11a having a conductor (wiring) pattern (not specifically illustrated) formed thereon, and a second surface 11b on the opposite side of the substrate 11 from the first surface 11a. Circuit components can be mounted on the first surface 11a and the second surface 11b, and are typically soldered to the conductor pattern of substrate 11.

The motherboard 205 includes substrate 224, and a plurality of circuit components 225 such as a semiconductor chips and packaged semiconductor elements. The substrate 224 has a plurality of conductor patterns (not specifically illustrated) formed thereon. The circuit components 225 are mounted on the substrate 224 and electrically connected to the conductor pattern on the substrate 224 through soldering or the like.

Figure 4A:
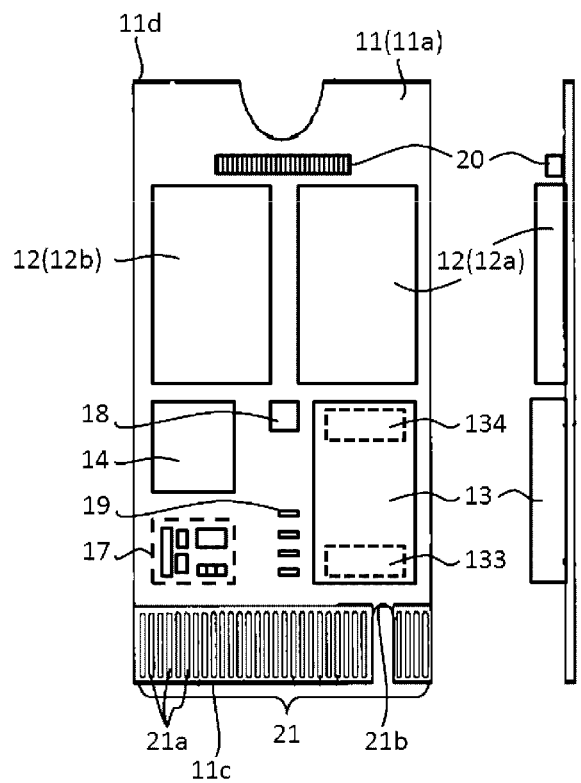
FIG. 4A is a front view and a corresponding side view of the semiconductor device according to the first embodiment.
Figure 4B:
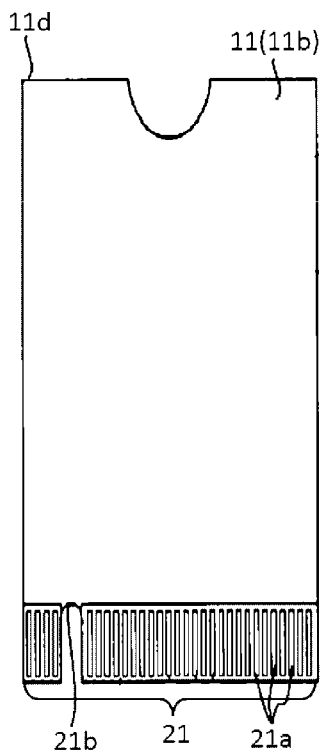
FIG. 4B is a rear view of the semiconductor device according to the first embodiment.
Figure 5:
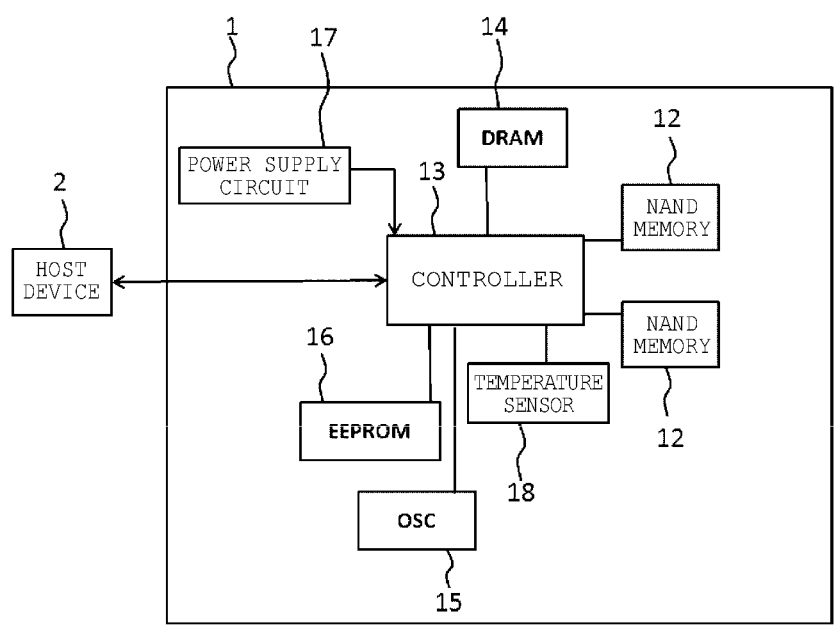
FIG. 5 is a block diagram depicting a system configuration of the semiconductor device according to the first embodiment.

FIGS. 4A and 4B illustrate the semiconductor device 1. FIG. 4A is a front view and a corresponding side view. FIG. 4B is a rear view. Further, FIG. 5 depicts an example of a system configuration of a semiconductor device 1.

As illustrated in FIGS. 4A and 4B the semiconductor device 1 includes a substrate 11, a NAND type flash memory (NAND memory) 12 which is anon-volatile semiconductor memory element, a controller 13, a dynamic random access memory (DRAM) 14 which is a volatile semiconductor memory element capable of performing a fast memory operation compared to the NAND memory 12, an oscillator 15 (OSC), an electrically erasable and programmable ROM (EEPROM) 16, a power supply circuit 17, a temperature sensor 18, other electronic components 19 (such as resistors and/or capacitors), and a pass-through connector 20.

In addition, the NAND memory 12 and the controller 13 according to the first embodiment are mounted as a single semiconductor package as an integrated electronic component. For example, the semiconductor package of the NAND memory 12 is a system-in-package (SiP) type module, and a plurality of semiconductor chips are sealed in one package. The controller 13 controls the operation of the NAND memory 12.

The substrate 11 is, for example, a generally rectangular circuit substrate made of material such as fiberglass-reinforced epoxy resin, and defines the outer dimension of the semiconductor device 1. The substrate 11 includes a first surface 11a and a second surface 11b positioned on the opposite side of the first surface 11a. In the present disclosure, surfaces of substrate 11 other than the first surface 11a and the second surface 11b are defined as "side surfaces" of the substrate 11.

In the semiconductor device 1, the first surface 11a is a component mounting surface on which the NAND memory 12, the controller 13, the DRAM 14, the oscillator 15, the EEPROM 16, the power supply circuit 17, the temperature sensor 18, and other electronic components 19 (such as a resistor and a capacitor) are mounted.

In the first embodiment, the second surface 11b of the substrate 11 is a non-component mounting surface to which components are not mounted. Thus, a plurality of components which are provided independently on the substrate 11 are arranged on only one surface of the substrate 11, thereby allowing these components to protrude from the surface of the substrate 11 only on one surface side of the substrate 11. This enables a reduction in the thickness of the semiconductor device 1, as compared to the case where components protrude from both the first surface 11a and the second surface 11b of the substrate 11.

As illustrated in FIGS. 4A and 4B, the substrate 11 includes a first edge portion 11c, and a second edge portion 11d positioned on the opposite side of the first edge portion 11c. The first edge portion 11c includes an interface unit (a substrate interface unit, a terminal portion, and a connecting portion).

The interface unit 21 includes, for example, a plurality of connection terminals 21a (metal terminals). The interface unit 21 is inserted into the connector 3 of the host device 2, and is thereby electrically connected to the connector 3. The interface unit 21 exchanges signals (e.g., a control signal and a data signal) between the interface unit 21 and the host device 2. In this example, the host device 2 is the portable computer 201 described above.

The interface unit 21 according to this example t is an interface conforming to, for example, the PCI Express (PCIe) standard. In other words, high-speed signals (high-speed differential signals) conforming to the PCIe standard flow between the interface unit 21 and the host device 2. In other examples, the interface unit 21 may conform to other standards such as serial advanced technology attachment (SATA), universal serial bus (USB), and serial attached SCSI (SAS). In this embodiment, the semiconductor device 1 is supplied with power from the host device 2 through the interface unit 21.

A slit 21b is formed at a position shifted from the center line in the widthwise direction of the substrate 11, in the interface unit 21, The slit 21b fits the projections or protrusions (not illustrated) formed on the connector 3 side of the host device 2. Incorporation of a slit 21b (and corresponding projections on the connector 3 side) as describe can be used to prevent the semiconductor device 1 from being mounted in an improper a front and rear reversed manner in the connector 3.

The power supply circuit 17 is, for example, a DC-DC converter, and generates a predetermined voltage. Power at the predetermined voltage is required for operation of the semiconductor package and the like. The power at the predetermined voltage is generated from power supplied from the host device 2. Further, it is desirable that the power supply circuit 17 is installed in the vicinity of the interface unit 21 to suppress losses in the power supplied from the host device 2.

The controller 13 controls the operation of the NAND memory 12. In other words, the controller 13 controls the writing, reading, and erasing data in the NAND memory 12.

The DRAM 14 is an example of a volatile memory and can be used for storage of management information for the NAND memory 12, data caching, and the like. Here, DRAM 14 is a dynamic random access memory (DRAM) type volatile memory but other types of volatile memory, such as static random access memory (SRAM), may be used for the DRAM 14 component. For example, other volatile memories, such as an SRAM, may be used instead of or in addition to DRAM in the DRAM 14 component.

The oscillator 15 supplies an operation signal of a predetermined frequency to the controller 13. The EEPROM 16 stores a control program or the like as fixed data.

The temperature sensor 18 notifies the controller 13 of the temperature of the semiconductor device 1. Further, in the first embodiment, a single temperature sensor 18 is mounted on the substrate 11, and the temperature of the semiconductor device 1 is monitored by this single temperature sensor 18.

In the first embodiment, a plurality of types of electronic components such as the NAND memory 12, the controller 13, and the DRAM 14 are mounted on the substrate 11, and the respective temperatures of each component may differ depending on the operation state of the semiconductor device 1, the loads applied to the respective electronic components, and the like. Therefore, strictly speaking, the temperature of the semiconductor device 1 is not uniform over its entirety may vary locally.

Thus, in the first embodiment, "the temperature of the semiconductor device 1" is defined as a temperature measured in the location where the temperature sensor 18 is mounted. In other words, in the present embodiment, "the temperature of the semiconductor device 1" is a temperature proximate to the mounting position of the temperature sensor 18.

Further, the number of temperature sensors 18 needs not necessarily limited to one, and, for example, a plurality of temperature sensors 18 may be provided on the substrate 11, and the temperatures at a plurality of positions monitored. Further, the temperature sensor 18 does not necessarily need to be provided on the substrate 11, and may be provided as a function of the controller 13.

Likewise, the temperature sensor 18 may be mounted in the package interior such as in the NAND memory 12 and the controller 13, or may be provided so as to be affixed to the package surface. In this case, the temperature sensor 18 can measure more accurately the temperature of a single NAND memory 12 and the temperature of a single controller 13.

The pass-through connector 20 is provided, for example, on the first surface 11a of the substrate 11 to allow the connection between the semiconductor device 1 and other semiconductor devices. The semiconductor device 1 is connectable to other semiconductor devices through the harness 4 (later illustrated in FIG. 8) connected to the pass-through connector 20.

In the present embodiment, the number, the mounting positions, and the like of NAND memories 12 are not limited to those depicted in the drawings. For example, two NAND memories 12 (12a and 12b) are mounted on the first surface 11a of the substrate 11, but the number of NAND memories 12 is not limited.

Figure 6:
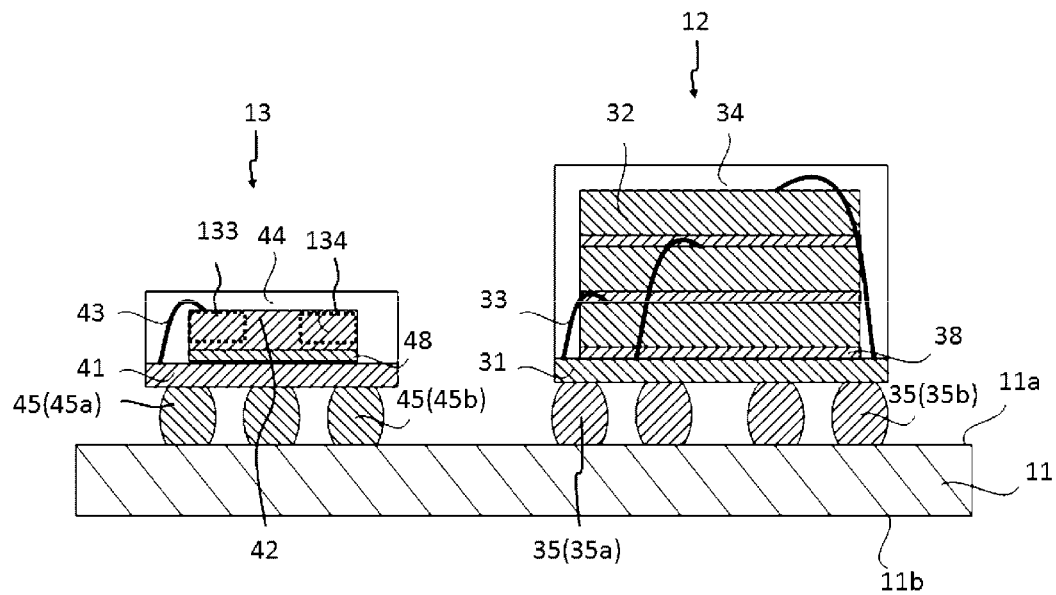
FIG. 6 is a cross-sectional view of a NAND memory and a controller.

FIG. 6 illustrates a cross-section in which a semiconductor package as the NAND memory 12 and a semiconductor package as the controller 13 are illustrated. The controller 13 includes a package substrate 41, a controller chip 42, a bonding wire 43, a sealing portion (mold material) 44, and a plurality of solder balls 45. The NAND memory 12 includes a package substrate 31, a plurality of memory chips 32, a bonding wire 33, a sealing portion (mold material) 34, and a plurality of solder balls 35.

The substrate 11 is, for example, a multi-layer wiring substrate, as described above, including a power layer, a ground layer, and an internal wiring, which are not specifically illustrated. The substrate 11 is connected to the controller chip 42 and the plurality of semiconductor memories 32, through bonding wires 33 and 43, the plurality of solder balls 35 and 45, and the like.

As illustrated in FIG. 6, the plurality of solder balls 35 and 45 are provided on the package substrates 31 and 41. The plurality of solder balls 35 and 45 are arranged, for example, in a lattice pattern on the second surface 31b of the package substrate 31. In addition, the plurality of solder balls 35 need not cover the entire second surface 31b of the package substrate 31, and rather may be partially placed on the second surface 31b Further, the package substrates 31 and 41 are respectively fixed to the controller chip 42 and the semiconductor memory 32, and the plurality of semiconductor memories 32 are fixed with each other through mounting films 38 and 48.

In addition, after the mounting films 38 and 48 are respectively affixed to the package substrates 31 and 41, the memory chip 32 and the controller chip 42 may be mounted. Further, for example, an individual chip piece (e.g., controller chip 42) may be made by affixing the mounting film 48 to a wafer used for the controller chip 42, and dicing the wafer. The same is applied to the memory chip 32 and the mounting film 38.

As illustrated in FIGS. 4A and 4B, the controller 13 has a substantially rectangular shape, and includes a first edge portion in a widthwise direction, a second edge portion positioned on the opposite side from the first edge portion, a third edge portion in a longitudinal direction, and a fourth edge portion positioned on the opposite side from the third edge portion. Further, the second edge portion is positioned on the NAND memory 12 side that is mounted on the substrate 11 adjacent to the controller 13, and the first edge portion is positioned on the interface unit 21 side included in the substrate 11.

Further, the solder balls 45 includes a solder ball 45a present on the first edge portion side of the controller 13 and a solder ball 45b present on the second edge portion side. Further, the solder balls 35 includes a solder ball 35a positioned on the controller 13 side, and a solder ball 35b positioned on the opposite side of the solder ball 35a.

Figure 7:
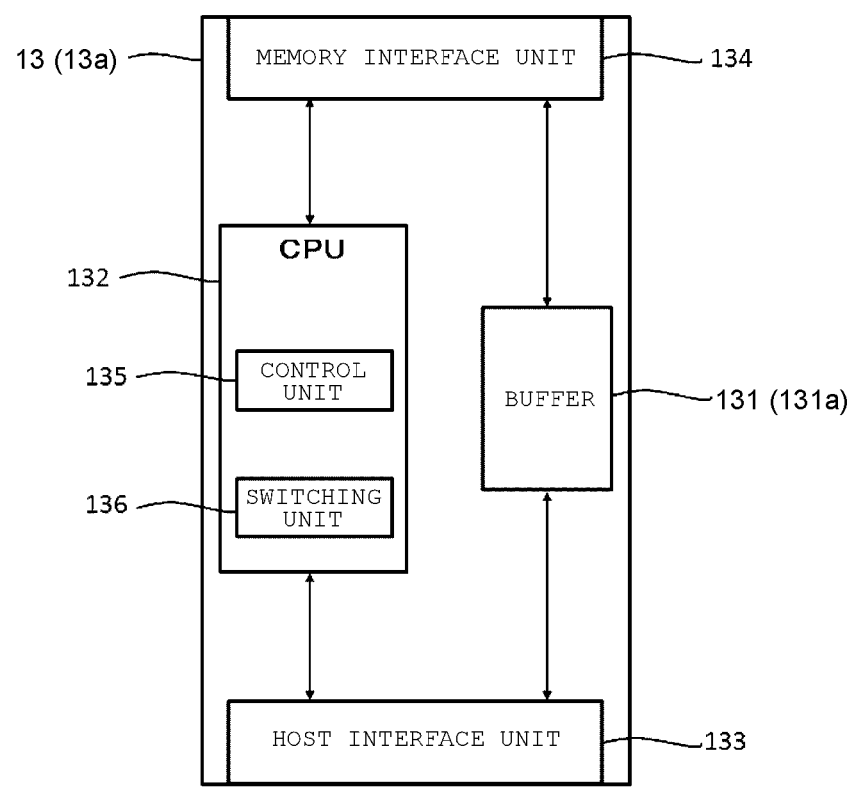
FIG. 7 is a block diagram depicting a system configuration of the controller.

FIG. 7 is an example of a system configuration of the controller 13. As illustrated in FIG. 7, the controller 13 includes a buffer 131, a central processing unit (CPU) 132, a host interface unit 133, and a memory interface unit 134.

Further, as described above, the controller 13 may include or provide the function of the temperature sensor 18, and the function of the power supply circuit 17; however, the system configuration of the controller 13 is not limited thereto.

When data is sent from the host device 2 to be written to the NAND memory 12, the buffer 131 temporarily stores a certain amount of this data; and when data is read from the NAND memory 12 to be sent to the host device 2, the buffer 131 temporarily stores a certain amount of this data.

The CPU 132 controls the entire semiconductor device 1. The CPU 132 includes a control unit 135 and a switching unit 136.

The control unit 135 receives, for example, a write command, a read command, and an erase command from the host device 2, accesses the region of the NAND memory 12 corresponding to an address or controls a data transfer process through the buffer 131.

The switching unit 136 switches the operation mode of the controller 13. Specifically, switching unit 136 receives a command from the host device 2, and performs an operation switching between a normal mode and a pass-through mode. The normal mode and the pass-through mode will be described later.

The host interface unit 133 is positioned between the interface unit 21 of the substrate 11, and the CPU 132 and the buffer 131. The host interface unit 133 performs an interface process between the controller 13 and the host device 2. For example, PCIe high-speed signals flow between the host interface unit 133 and the host device 2.

Further, the host interface unit 133 is arranged in the direction of the interface unit 21 of the substrate 11, in other words, so as to be closer to the first edge portion, in the controller 13. In this case, it is possible to shorten the wiring between the host interface unit 133 and the interface unit 21 of the substrate 11.

For example, if the host interface unit 133 is arranged in the opposite direction of the interface unit 21, in other words, so as to be closer to the second edge portion, in the controller 13, as can be seen from FIGS. 4A and 4B, the wiring distance connecting the interface unit 21 and the host interface unit 133 is extended by the length in the longitudinal direction of the controller chip. Since the wiring becomes long and parasitic capacitance, parasitic resistance, parasitic inductance, and the like increase, it is difficult to maintain the characteristic impedance of a signal wiring. This can be a cause of signal delay.

From the above viewpoint, it is desirable that the host interface unit 133 is arranged closer to the first edge portion in the controller 13, and for example, when a command is sent from the host device 2, the interface unit 21 receives signals from the host device 2 and exchanges signals with the host interface unit 133 from the wiring pattern of the substrate 11 through the solder ball 45a. Thus, the improvement of the operation stability of the semiconductor device 1 is achieved.

Further, it is desirable that electronic components are not mounted between the host interface unit 133 and the interface unit 21.

As described above, when the wiring distance between the host interface unit 133 and the interface unit 21 is long, there is a problem in that it is difficult to maintain the impedance of a signal wiring, and causes a signal delay. Thus, it is desirable that electronic components are mounted between the host interface unit 133 and the interface unit 21 in order to perform a wiring connecting the host interface unit 133 and the interface unit 21 at the shortest distance, in other words, linearly.

The power supply circuit 17 and the electronic component such as the DRAM 14 may generate noise during the operation. Since these electronic components are not mounted between the host interface unit 133 and the interface unit 21, the signals exchanged between the host interface unit 133 and the interface unit 21 are less likely to pick up noise, and the improvement of the operation stability of the semiconductor device 1 can be achieved.

The memory interface unit 134 is positioned between the NAND memory 12 and the CPU 132 and the buffer 131. The memory interface unit 134 performs an interface process between the controller 13 and the NAND memory 12.

In the present embodiment, the memory interface unit 134 is arranged in the direction of the opposite side of the interface unit 21, in other words, so as to be closer to the second edge portion, in the controller 13. In this case, it is possible to shorten the wiring distance between the memory interface unit 134 and the NAND memory 12.

The signal sent from the controller 13 is transmitted to the wiring pattern of the substrate 11 through the solder ball 45b, and is transmitted from the solder ball 35a to the memory chip 32. Thus, the wiring distance is reduced, and the improvement of the operation stability of the semiconductor device 1 is achieved.

Further, it is desirable that electronic components such as the power supply circuit 17 and the DRAM 14 are not also mounted between the memory interface unit 134 of the controller 13 and the NAND memory 12 on the substrate 11. This is because signals exchanged between the memory interface unit 134 and the interface unit 21 are less likely to pick up noise, and the improvement of the operation stability of the semiconductor device 1 is achieved.

Figure 8:
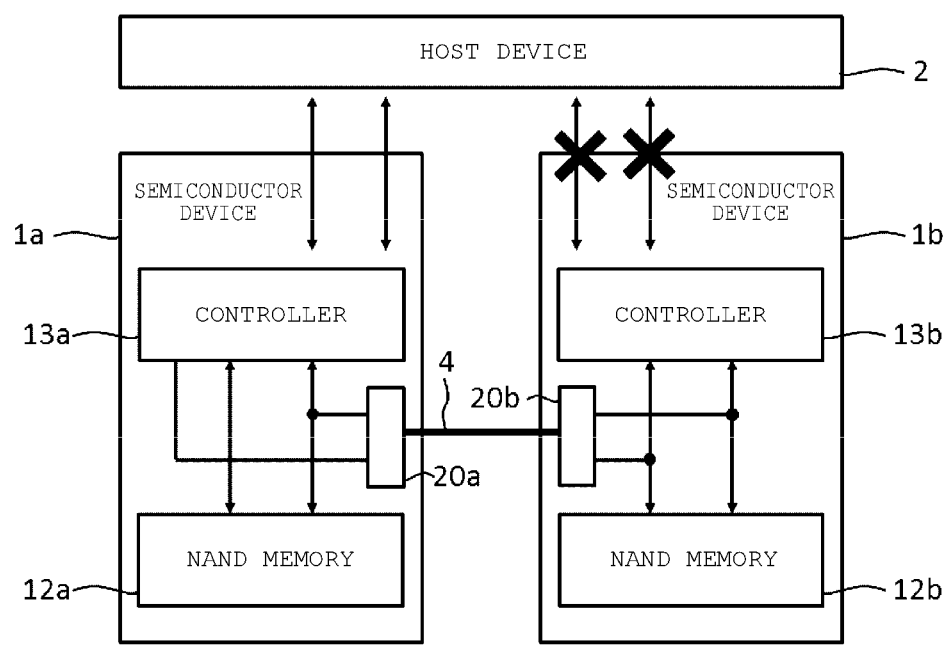
FIG. 8 is a diagram illustrating an example of a connection relationship of semiconductor devices according to the first embodiment.

FIG. 8 is a diagram illustrating a connection relationship between the semiconductor devices 1. Further, here, an example is illustrated in which a semiconductor device 1a and a semiconductor device 1b are connected. For convenience of explanation, in FIG. 8, the configuration of a portion of the semiconductor device 1a and the semiconductor device 1b is not illustrated.

Further, a pass-through connector 20a, a controller 13a, and a NAND memory 12a are provided in the semiconductor device 1a; and a pass-through connector 20b, a controller 13b, and a NAND memory 12b are provided in the semiconductor device 1b.

Further, in the following description, for example, the description associated with a "pass-through connector 20" can also be applied to a pass-through connector 20a and a pass-through connector 20b. Similarly, description associated with the semiconductor device 1, the controller 13, and the NAND memory 12 can also be corresponding elements 1a, 1b, 13a, and 13.

As illustrated in FIG. 8, in the present embodiment, the semiconductor device 1a and the semiconductor device 1b are connected through the pass-through connector 20 and harnesses 4. The number of harnesses 4 and the position of the pass-through connector 20 are not limited to those depicted in FIG. 8.

The pass-through connector 20 is connected to the internal wiring (not illustrated) of the substrate 11 connecting the controller 13 and the NAND memory 12. Further, a connecting method between the controller 13 and the NAND memory 12 is not limited to the internal wiring of the substrate 11.

Here, for this example, it is assumed that controller 13b is no longer functioning due to the failure of the semiconductor device 1b. In the present embodiment, the semiconductor device 1b includes the pass-through connector 20b, and is connected to the semiconductor device 1a through the harness 4. Since the controller 13b does not function in the semiconductor device 1b, it is not possible to read the data stored in the NAND memory 12b by using the controller 13b.

Thus, for this reason, the controller 13 is capable of performing two types of operations of the normal mode and the pass-through mode.

In the normal mode, for example, the command and data supplied from the host device 2 is subjected to an input and output process and a required logical-physical address conversion process by the controller 13a, and then stored (written) in the NAND memory 12a. Further, the data read from the NAND memory 12a is also subjected to the input and output process by the controller 13a, and read on the host device 2 side. The same is applied to the semiconductor device 1b. Incidentally, the controller 13a is typically operated in the normal mode.

Meanwhile, in the pass-through mode, the controller 13a is accessible to the NAND memory 12b of the semiconductor device 1b through the pass-through connector 20 and the harness 4. Incidentally, the controller 13 is typically operated in the normal mode, but is switched to the pass-through mode under predetermined conditions (according to predetermined input, command, and the like). Here, the predetermined input, command, and the like are given, for example, from the host device 2.

In the pass-through mode, the controller 13a accesses the NAND memory 12b of the semiconductor device 1b, and is capable of reading the data stored in the NAND memory 12b. Thus, it is possible to save data from the failed semiconductor device 1b.

Figure 9:
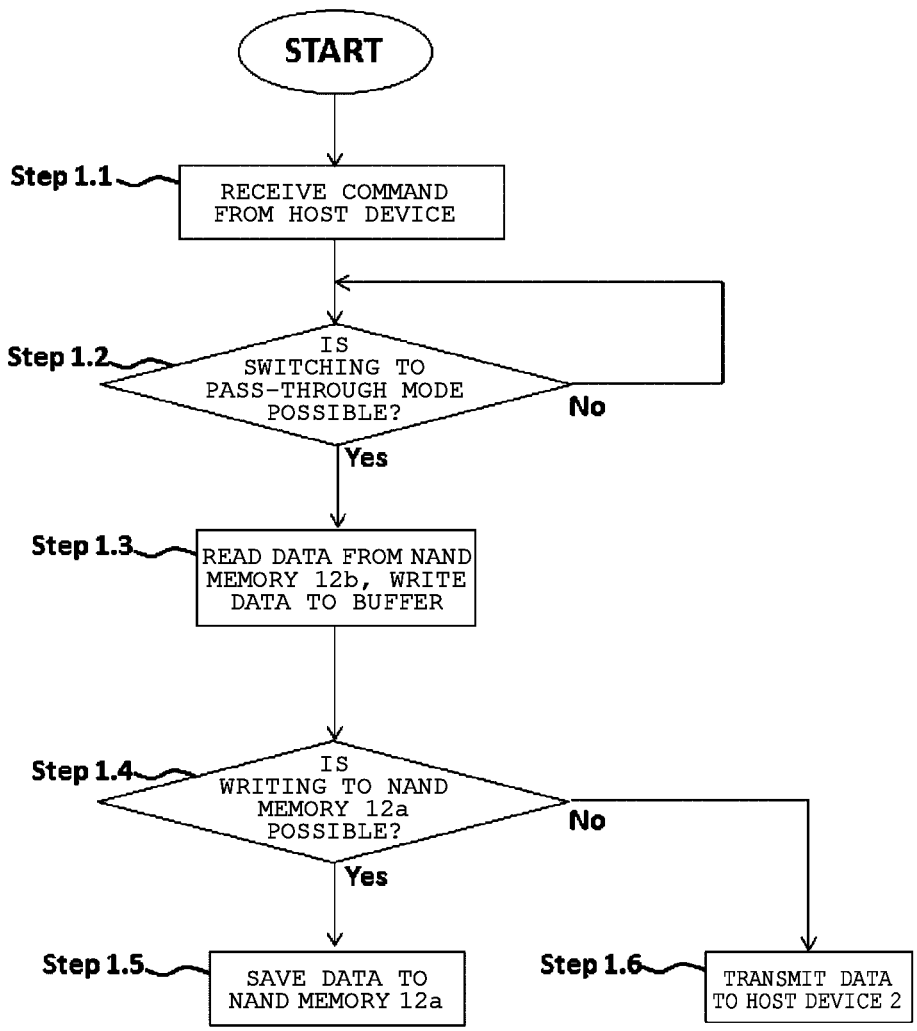
FIG. 9 is a flowchart illustrating an example of controller operation during data saving in the semiconductor device according to the first embodiment.

FIG. 9 is a flowchart illustrating an example of the operation of the controller 13a during data saving of the semiconductor device 1b according to the present embodiment. Further, it is again assumed that the semiconductor device 1b is failed, and a description will be made from the state where the host device 2 recognizes the failure of the semiconductor device 1b.

The controller 13a receives a command from the host device 2 (Step 1.1). Here, the command requests the controller 13a to perform switching to the pass-through mode.

The controller 13a that receives the command checks whether switching from the normal mode to the pass-through mode is possible (Step 1.2). While the semiconductor device 1 processes data in the normal mode (for example, when writing data to the NAND memory 12a, or when reading data from the NAND memory 12a), the controller 13a is on standby until switching to the pass-through mode is possible.

When the switching to the pass-through mode is possible, the controller 13a proceeds to the pass-through mode, and accesses the NAND memory 12b of the semiconductor device 1b. Thereafter, data is read from the NAND memory 12b, and data is stored in a buffer 131a (see FIG. 7) of the controller 13a (Step 1.3).

Next, the controller 13a checks whether writing to the NAND memory 12a is possible (Step 1.4). In other words, the controller 13a checks whether there is a free space for writing the data that is saved from the NAND memory 12b to the NAND memory 12a.

When there is a free space in the NAND memory 12a, the controller 13a reads data stored in the buffer 131a in Step 1.3, writes the data to the NAND memory 12a, and ends the saving of the data (Step 1.5).

In contrast, when the writing to the NAND memory 12a is not possible, the controller 13a reads data stored in the buffer 131a in Step 1.3, transmits the data to the host device 2, and ends the saving of the data (Step 1.6). The host device 2 that receives data in Step 1.6 may store data, for example, in other storage devices such as an SSD, a hard disk drive (HDD), a USB memory, or an SD card.

Further, when there is no free space (free block) in the NAND memory 12a in Step 1.4, a free space may be created in the NAND memory 12a, for example, by a process of memory management such as "garbage collection."

The garbage collection is an operation for creating a free space in NAND memory 12a by removing stale (invalid) data. Since the garbage collection operation increases the number of free blocks in the NAND memory 12a, valid data can be aggregated by using a plurality of erase blocks in which valid data and invalid data are mixed.

In the garbage collection operation, valid data is read from a group of blocks in which valid data and invalid data are mixed. After the data is read from the group of blocks, the valid data is aggregated and written to an erased block or blocks. As a result, the valid data is collected and written into blocks without the previously intermixed invalid data being included. Blocks having only invalid data are reusable as free blocks.

Through the above operation, a region for data saving of the NAND memory 12b is secured in the NAND memory 12a.

Here, the case is considered where a pass-through connector 20 is not provided in the semiconductor device 1. In this case, when the semiconductor device 1 is failed, it is not possible to access the NAND memory 12b, and it is not possible to read data stored in the NAND memory 12b.

Further, if a pass-through terminal (a terminal for accessing directly the NAND memory 12 without passing through the controller 13) is provided in the semiconductor device 1, it is possible to read data by using, for example, an external reading device, but generally a device dedicated for reading used in such application is expensive.

Thus, in the present embodiment, the semiconductor device 1a includes a pass-through connector 20, and the controller 13a can be switched to the pass-through mode, such that it is possible to directly access the NAND memory 12b mounted in the semiconductor device 1b.

Therefore, it is possible to directly access the NAND memory 12b in which data to be retrieved is stored, and it is also possible to directly save data to the NAND memory 12a of the semiconductor device 1a. Therefore, since it is not necessary to pass through the host device 2 and other external devices, it is possible to simplify the process of data saving. In addition, since data is exchangeable amongst the semiconductor devices 1 directly, there is no need to use an expensive device such as an external reading device.

Figure 10:
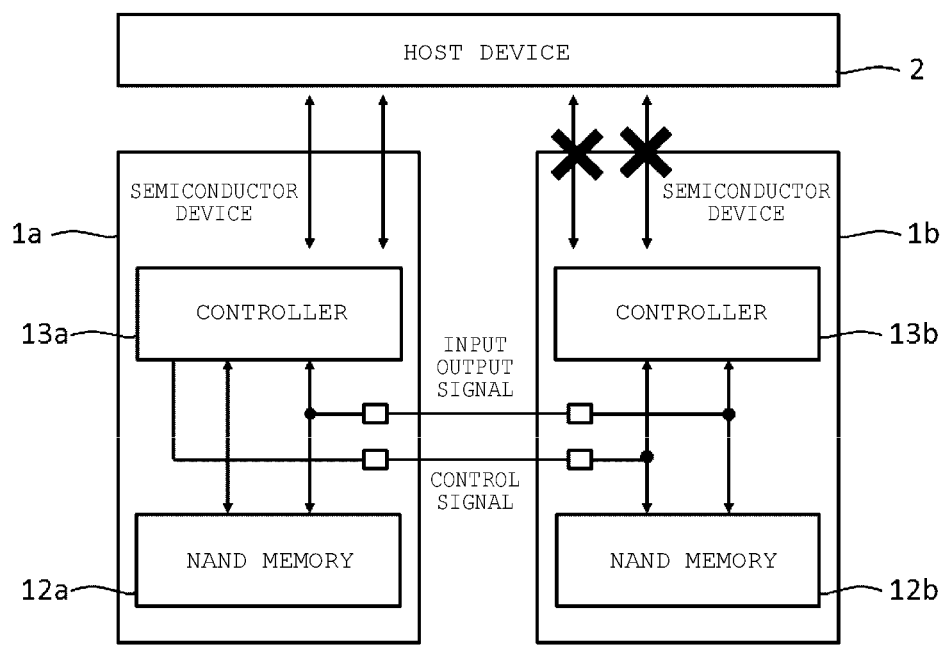
FIG. 10 is a diagram illustrating another example of a connection relationship of semiconductor devices according to the first embodiment.

Incidentally, the pass-through connector 20 is only an example of a unit that connects the semiconductor device 1a and the semiconductor device 1b, and for example, as depicted in FIG. 10, it may be configured such that various control signals and various input and output port signals are connected by a plurality of connecting units.

Second Embodiment

Figure 11A:
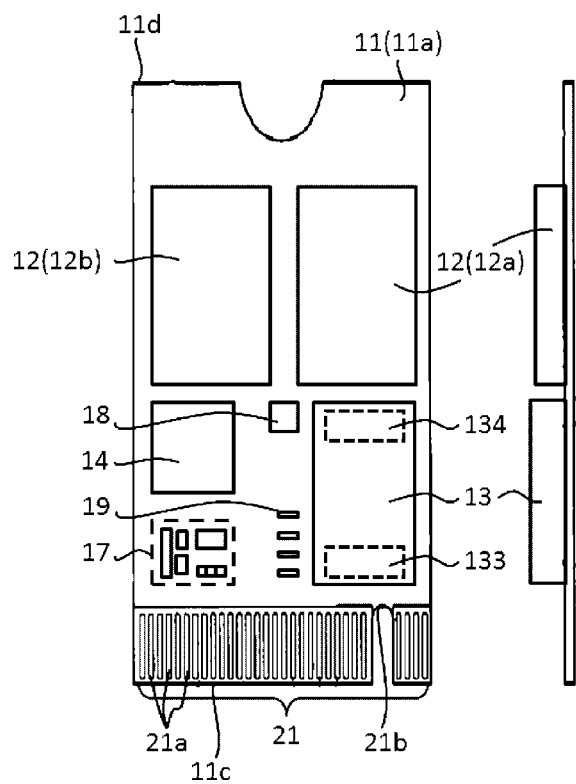
FIG. 11A is a front view and corresponding side view of a semiconductor device according to a second embodiment.
Figure 11B:
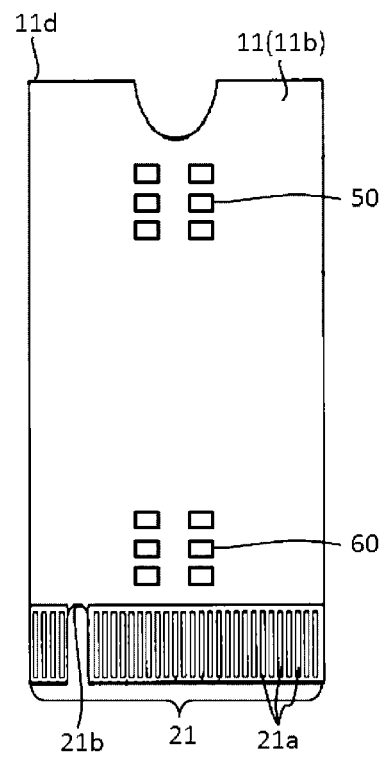
FIG. 11B is a rear view of the semiconductor device according to the second embodiment.

FIGS. 11A and 11B illustrate appearances of a semiconductor device 1 according to a second embodiment. FIG. 11A is a front view and a side view and FIG. 11B is a rear view. Further, FIG. 12 is a diagram illustrating a configuration during connection between semiconductor devices 1a and a semiconductor device 1b according to the second embodiment.

As illustrated in FIGS. 11A and 11B, the semiconductor device 1 according to the second embodiment includes a power supply terminal 60 and a pass-through terminal 50 on the second surface 11b of the substrate 11. The power supply terminal 60 is a terminal for starting the semiconductor device 1, and is capable of supplying power, for example, from the outside. The pass-through terminal 50 enables the direct access to the NAND memory 12 from the outside.

The pass-through terminal 50 is connected to at least a portion of the internal wiring (not illustrated) of the substrate 11 that is connected to the controller 13 and the NAND memory 12. Further, a method of connecting the controller 13 and the NAND memory 12 is not limited to the internal wiring of the substrate 11.

Figure 12:
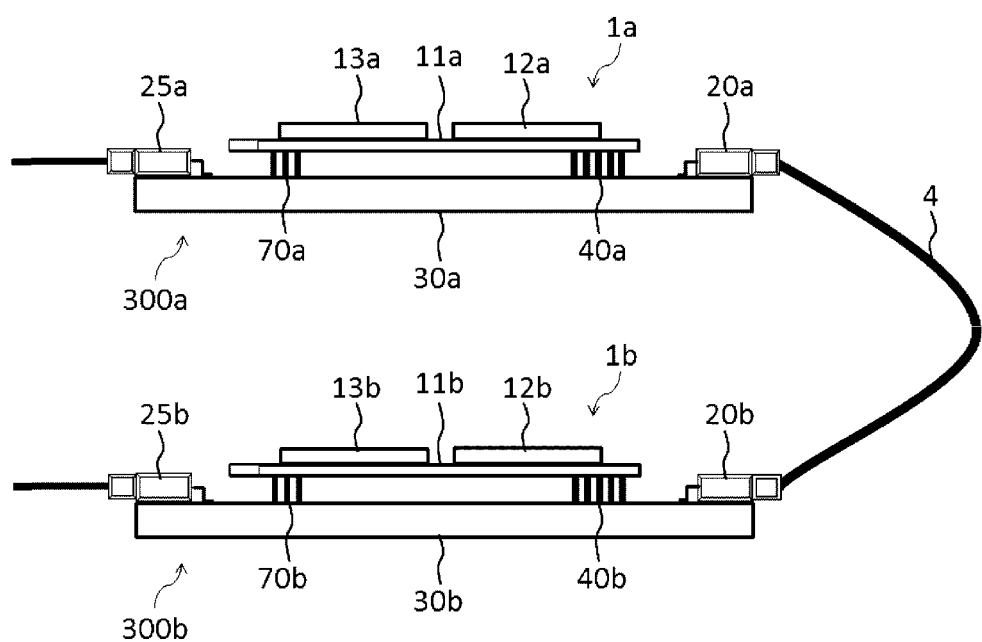
FIG. 12 is a diagram illustrating an example of a connection relationship between semiconductor devices according to the second embodiment.

As illustrated in FIG. 12, the semiconductor device 1 according to the second embodiment is connected to the pass-through device 300. The pass-through device 300 includes pass-through connector 20, a start connector 25, a base board 30, a start pin 70, and a pass-through pin 40.

The base board 30 is, for example, a substantially rectangular circuit substrate made of a material such as fiber glass reinforced epoxy resin. The base board 30 is, for example, a multi-layer wiring substrate, and includes a ground layer, a power layer, and a wiring layer (not specifically illustrated).

The start connector 25 is connected to, for example, the host device 2, and supplies power from the host device 2 to the semiconductor device 1. The start connector 25 is provided on the base board 30, and is electrically connected to the start pin 70 by an internal wiring (not illustrated).

The start pin 70 is, for example, a contact probe pin provided on the base board 30 and is connected to the power supply terminal 60 provided on the second surface 11b of the semiconductor device 1.

The pass-through pin 40 is, for example, a contact probe pin provided on the base board 30 and is connected to the pass-through terminal 50 provided on the second surface 11b of the semiconductor device 1.

Further, the start pin 70 and the pass-through pin 40 are not necessarily projecting contact probe pins, and, for example, may be connected to the semiconductor device 1 using a socket-like configuration.

The pass-through connector 20 is provided on the base board 30, and is electrically connected to the pass-through pin 40 by an internal wiring (not illustrated).

In addition, the configurations described above are common to the semiconductor device 1a and the semiconductor device 1b, and the pass-through device 300a and the pass-through device 300b.

The semiconductor device 1a and the semiconductor device 1b are connected through the harness 4. Specifically, the harness 4 is connected to the pass-through connector 20a provided in the pass-through device 300a to which the semiconductor device 1a is connected, and the pass-through connector 20b provided in the pass-through device 300b to which the semiconductor device 1b is connected.

With the above second embodiment configuration, for example, when the semiconductor device 1b is failed, the semiconductor device 1a directly accesses the NAND memory 12b of the semiconductor device 1b, and is capable of reading data of the NAND memory 12b, in a similar manner to the first embodiment.

Further, in the second embodiment, the pass-through connector 20 is not provided on the semiconductor device 1, but rather the pass-through device 300 is provided therein. Thus, it is not necessary to secure a mounting space for the pass-through connector 20 in the semiconductor device 1, and it is possible to reduce the overall size of the semiconductor device 1.

In addition, in the second embodiment, the pass-through terminal 50 is provided on the second surface 11b of the substrate 11 of the semiconductor device 1. Therefore, it is not necessary to include a space or the like for mounting the pass-through terminal 50, the pass-through connector 20, and the like, when mounting respective components on the first surface 11a which is a component mounting surface.

Further, in the second embodiment, at least as long as the pass-through terminal 50a and the pass-through terminal 50b which respectively are provided in the semiconductor device 1a and semiconductor device 1b are connected to each other and power is supplied to the semiconductor device 1a and the semiconductor device 1b, it is not necessary to use the pass-through device 300 as illustrated in FIG. 12.

The first embodiment and the second embodiment are described as above, but the terms and the like used in the description are not limited thereto. For example, since the pass-through connector 20, the pass-through terminal 50, and the like as described above connect the semiconductor device 1a and the semiconductor device 1b, the connector 20 and the terminal 50 may collectively be referred to as a connecting portion.

From the above description, "connecting portion" may be configured such that the controller 13a of the semiconductor device 1a is able to directly access the NAND memory 12b (data stored in the NAND memory 12b) of the semiconductor device 1b. Further, "directly" described above refers to access without passing through, for example, the host device 2, the controller 13b, and the like.

Therefore, for example, in the first embodiment, the semiconductor device 1a and the semiconductor device 1b may be connected, for example, in a wireless manner. In other words, "connecting" includes not only wiring, but also wireless connection. Further, in this case, the connecting portion needs not necessarily be provided on the substrate 11, and for example, the connecting portion may be provided as a part of the functions of the controller 13, or may be provided in the package of the NAND memory 12.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device, comprising:
    a first circuit board substrate;
    a plurality of terminals along a first edge portion of the first circuit board substrate, the plurality of terminals being connectable to a host device;
    a first memory module on a surface of the first circuit board substrate; and
    a first controller on the surface of the first circuit board substrate and spaced from the first memory module in a direction parallel to the surface, the first controller configured to:
        control the first memory module, and
        switch an operation mode in response to a command from the host device such that in a first operation mode the first controller reads data from the first memory module and in a second operation mode the first controller reads data from a second memory module on a second circuit board substrate spaced from the first circuit board
    wherein, when in the second operation mode, the first controller accesses the second memory module directly through a first connecting portion that is away from the first edge portion of the first circuit board substrate.

2. The semiconductor device according to claim 1, wherein the first connection portion comprises a connector and a harness.

3. The semiconductor device according to claim 2, wherein the connector is on the surface of the first circuit board substrate.

4. The semiconductor device according to claim 2, wherein the connector is on a device to which the first circuit board substrate is mounted.

5. The semiconductor device according to claim 1, wherein the first controller is configured to read data from the second memory module and write the data to the first memory module.

6. The semiconductor device according to claim 5, wherein the first controller is configured to receive a command from the host device to read data from the second memory module, then check whether writing data to the first memory module is possible, and then to write data read from the second memory module to the first memory module if possible.

7. The semiconductor device according to claim 6, wherein, if the writing of data to the first memory module is not possible, the first controller is configured to transmit the data read from the second memory module to the host device via the plurality of terminals.

8. The semiconductor device according to claim 6, wherein when the writing of data to the first memory module is not possible, the first controller is configured to perform a garbage collection process on the first memory module.

9. The semiconductor device according to claim 1, wherein the second circuit board substrate includes a second controller mounted thereon, and
    the first and second circuit board substrates are substantially identical to each other.

10. An electronic device, comprising:
    a host device board including a first interface connector and a second interface connector;
    a first circuit board substrate connected to the first interface connector and including a first memory module, a first controller, and a first pass-through connector disposed thereon;
    a second circuit board substrate connected to the second interface connector and including a second memory module, a second controller, and a second pass-through connector disposed thereon, wherein
    the first and second circuit board substrates are physically spaced from each other on the host device board,
    a direct electrical connection pathway is provided between the first and second circuit board substrates via the first pass-through connector and the second pass-through connector, and
    the first controller includes a first processor unit, a first host interface unit, and a first memory interface unit, and is configured to switch between a first operating mode and a second operating mode according to a command from a host device such that in the first operating mode the first controller reads data from the first memory module and in the second operating mode the first controller reads data from the second memory module via the direct electrical connection pathway.

11. The electronic device according to claim 10, wherein the first controller is configured to write data read from the second memory module to the first memory module.

12. The electronic device according to claim 10, wherein the first controller is configured to transmit data read from the second memory module to the host device.

13. The electronic device according to claim 10, wherein the first memory module comprises a flash memory.

14. The electronic device according to claim 10, wherein the first and second circuit board substrates are solid-state storage device cards.

15. The electronic device according to claim 10, wherein the first and second interface connectors each comprise a connector slot in to which the first and second circuit board substrates are inserted.

16. The electronic device according to claim 10, wherein the second controller includes a second processor unit, a second host interface unit, and a second memory interface unit, and is configured to switch between a first operating mode and a second operating mode according to a command from the host device such that in the first operating mode the second controller reads data from the second memory module and in the second operating mode the second controller reads data from the first memory module via the direct electrical connection.

17. The electronic device according to claim 10, wherein the first circuit board substrate and the first interface connector conform to a PCI Express standard.

18. A semiconductor device, comprising:
- a first memory module having a first connection pathway to a host device;
- a second memory module having a second connection pathway to the host device; and
- a memory controller configured to access the first memory module and to perform switching so as to directly access the second memory module via a third connection pathway according to a predetermined condition, the third connection pathway not including any portions of the first and second connection pathways.

19. The semiconductor device according to claim 18, wherein
- the first and second memory modules are on different substrates physically separated from each other, comprise flash-type memory, and
- the predetermined condition is receipt of a command from the host device by the memory controller, the command requesting data be read from the second memory module.

20. The semiconductor device according to claim 19, wherein the third connection pathway comprises a wiring spanning a gap between the different substrates.

* * * * *